(12) United States Patent
Spencer

(10) Patent No.: US 7,887,114 B2
(45) Date of Patent: Feb. 15, 2011

(54) ADJUSTABLE TOOLBOX

(75) Inventor: Michael Spencer, Hubbard, NE (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 12/275,910

(22) Filed: Nov. 21, 2008

(65) Prior Publication Data

US 2009/0127881 A1 May 21, 2009

Related U.S. Application Data

(60) Provisional application No. 60/989,509, filed on Nov. 21, 2007.

(51) Int. Cl.
*B60R 9/06* (2006.01)
*B60P 7/02* (2006.01)

(52) U.S. Cl. ................... 296/37.6; 296/100.02

(58) Field of Classification Search ............... 296/37.6, 296/100.01, 100.02
See application file for complete search history.

(56) References Cited

U.S. PATENT DOCUMENTS

| | | | | |
|---|---|---|---|---|
| 4,946,215 A * | 8/1990 | Taylor | | 296/37.6 |
| 5,605,264 A * | 2/1997 | Neal | | 224/404 |
| 5,924,616 A * | 7/1999 | Shives | | 224/404 |
| 5,992,719 A * | 11/1999 | Carter, III | | 224/404 |
| 6,276,735 B1 * | 8/2001 | Champion | | 296/37.6 |
| 2006/0102669 A1 * | 5/2006 | Fouts et al. | | 224/404 |

* cited by examiner

*Primary Examiner*—Dennis H Pedder
(74) *Attorney, Agent, or Firm*—Harness, Dickey & Pierce, P.L.C.

(57) ABSTRACT

An adjustable toolbox for use in conjunction with a bed on a pickup. The adjustable toolbox includes a base portion, a mounting portion and a lid portion. The base portion has a recess formed therein that is adapted to receive at least one object. The mounting portion is operably attached to the base portion so that at least part of the mounting portion is slidable with respect to the base portion to adjust a width of the adjustable toolbox. The lid portion is operably attached to at least one of the base portion and the mounting portion.

6 Claims, 9 Drawing Sheets

ADJUSTABLE TOOLBOX

REFERENCE TO RELATED APPLICATION

This application claims priority to U.S. Provisional Applic. No. 60/989,509, entitled ADJUSTABLE TOOLBOX, which was filed on Nov. 21, 2007, and U.S. Provisional Applic. No. 61/041,016, entitled COMPOSITE TOOLBOX, which was filed on Mar. 31, 2008, the details of which are incorporated herein by reference.

FIELD OF THE INVENTION

The invention generally relates to storage containers for vehicles. More particularly, the invention relates to storage containers for pickups.

BACKGROUND OF THE INVENTION

Pickups are a quite popular type of vehicle because the pickups enable objects of various sizes to be placed in the bed of the pickup and then be transported. The bed of the pickup generally has a floor surface that is bounded by a front wall, a pair of side walls, and a back wall.

At least one of the front wall, the side walls and the back wall may be movable to facilitate placing objects into the bed and removing objects from the bed. For example, the back wall of many pickup beds may pivot from a closed position in which the back wall is substantially vertically oriented to an open position in which the back wall is substantially horizontally oriented.

While the front wall, the side walls and the back wall preclude objects from sliding out of the pickup bed, these walls do not retain objects at specific locations within the pickup bed.

Additionally, the open top of the pickup bed does not shield or otherwise protect objects stored in the pickup bed from damage by environmental factors such as rain and snow. The open top of the pickup bed also means that objects placed in the pickup bed are visible to persons near the pickup bed, which makes the objects vulnerable to theft.

To protect objects placed in the bed of a pickup from damage from environmental factors or theft, tonneau covers may be placed over the bed to substantially cover the bed. The tonneau covers are typically attached to the sides of the pickup bed.

There are two primary types of tonneau covers—hard and soft. Hard tonneau covers have a relatively hard surface that extends over the pickup bed. The hard tonneau covers may be in a single piece or in several pieces that are pivotable with respect to each other.

Soft tonneau covers, on the other hand, are made from a flexible material such as vinyl that permits the soft tonneau covers to be at least partially rolled up to provide access to items stored in the pickup bed.

To retain objects at desired locations in the pickup bed and thereby enhance the ability to access such items, a toolbox may be attached to the pickup box. The toolboxes typically include a box and a lid pivotally attached thereto. The toolboxes are typically mounted to the side of the pickup bed proximate the front end of the pickup bed.

Because the toolboxes extend over the sides of the pickup bed, it is not possible to use conventional tonneau covers in pickup beds that also have tonneau covers attached thereto. Rather, it is necessary to purchase a special size tonneau cover that may be used in conjunction with the toolbox.

The special size tonneau cover may only be used when the toolbox is in the pickup bed because the special size tonneau cover would only cover a portion of the pickup bed when the toolbox is removed.

SUMMARY OF THE INVENTION

According to an embodiment of the invention, an adjustable toolbox is provided. The adjustable toolbox has an adjustable width that enables the adjustable toolbox to be used in conjunction with pickup beds having a variety of widths.

DETAILED DESCRIPTION OF THE PREFERRED EMBODIMENTS

Figure 1:
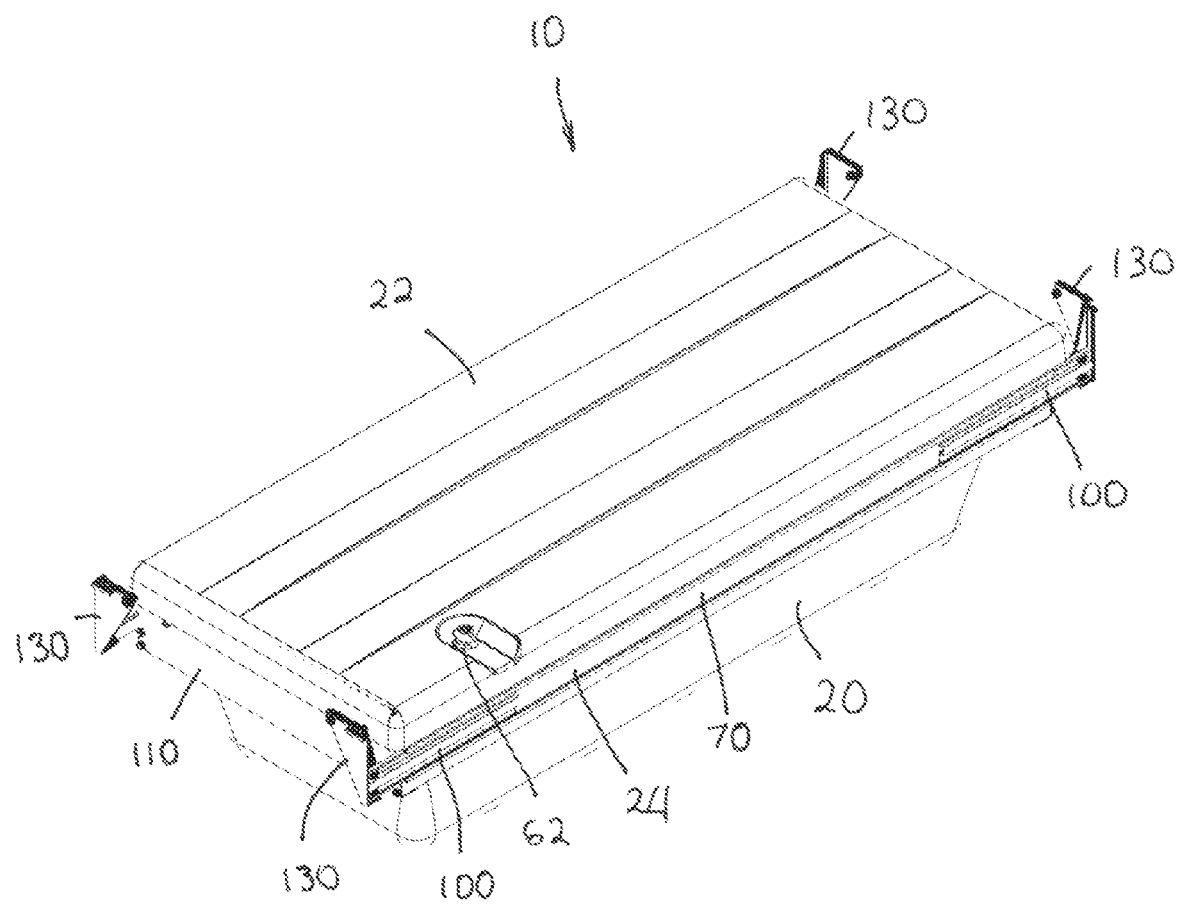
FIG. 1 is a perspective view of an adjustable toolbox according to an embodiment of the invention.
Figure 2:
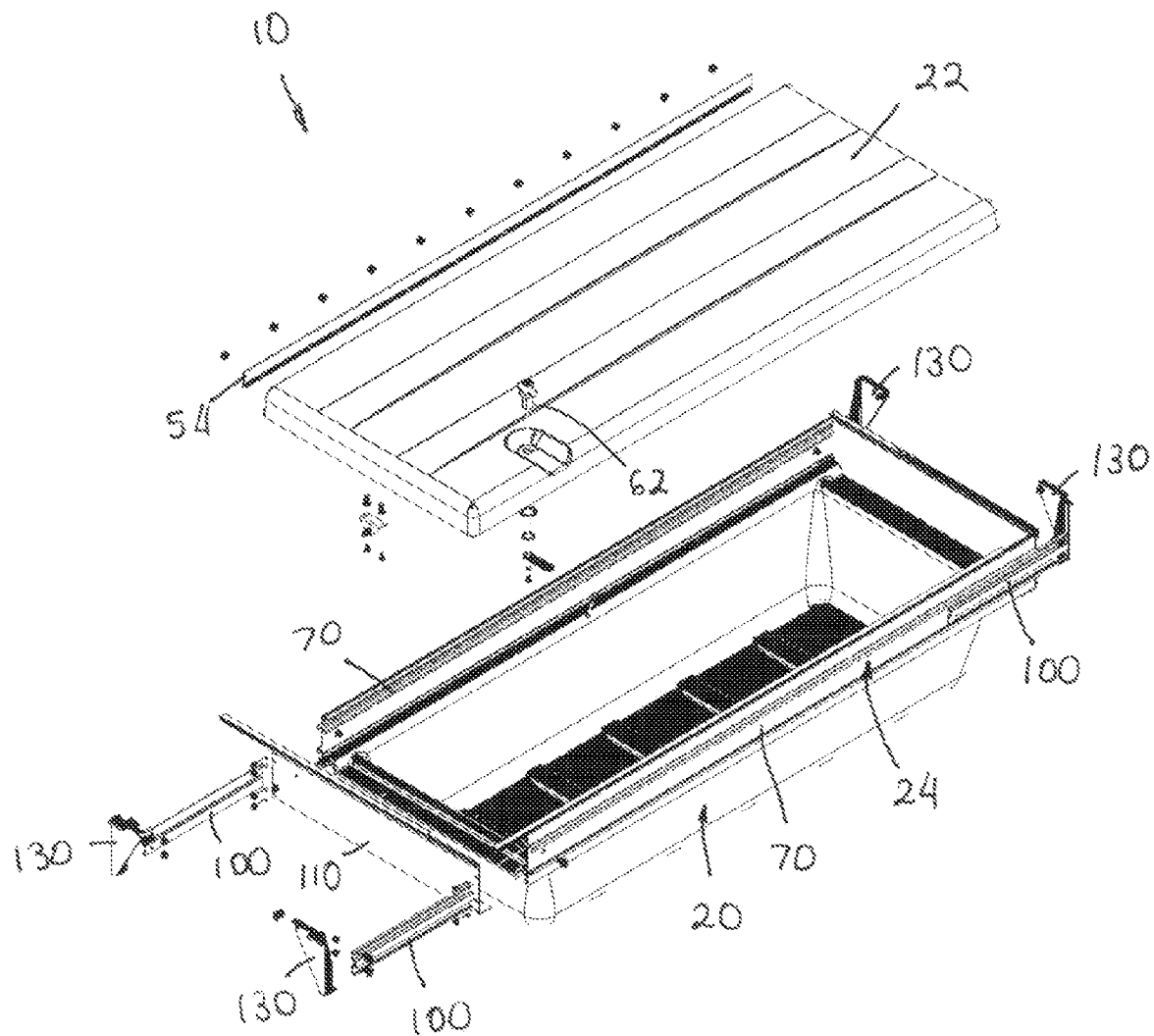
FIG. 2 is an exploded perspective view of the adjustable toolbox.
Figure 3:
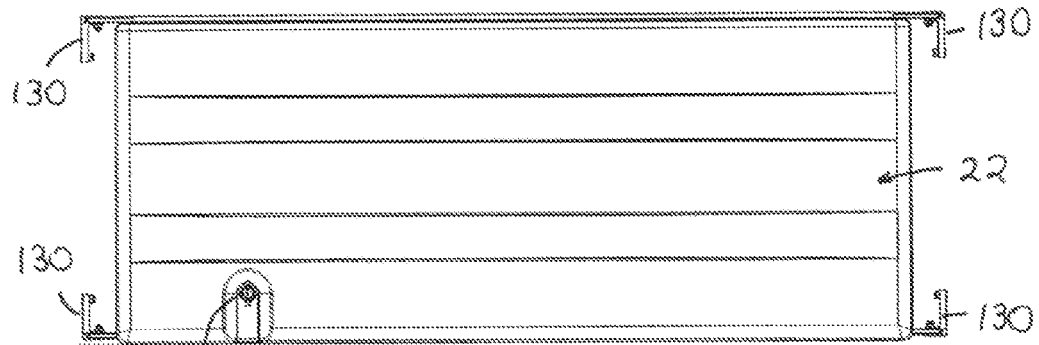
FIG. 3 is a top view of the adjustable toolbox.
Figure 4:
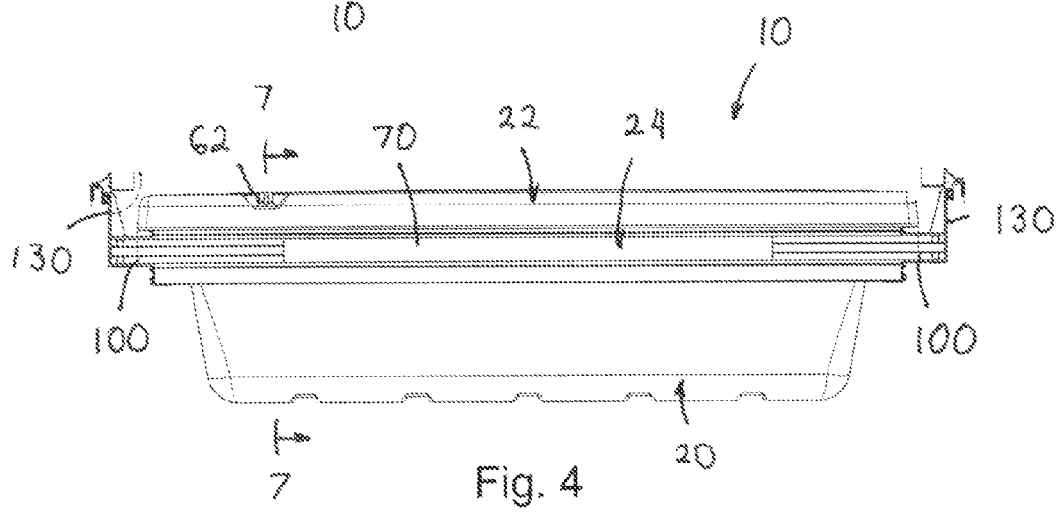
FIG. 4 is a front view of the adjustable toolbox.
Figure 5:
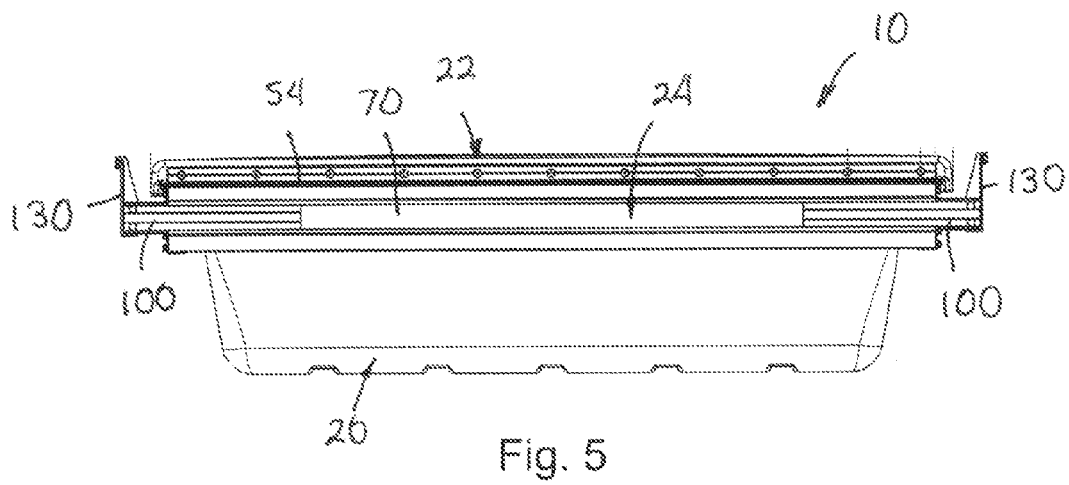
FIG. 5 is a back view of the adjustable toolbox.
Figure 6:
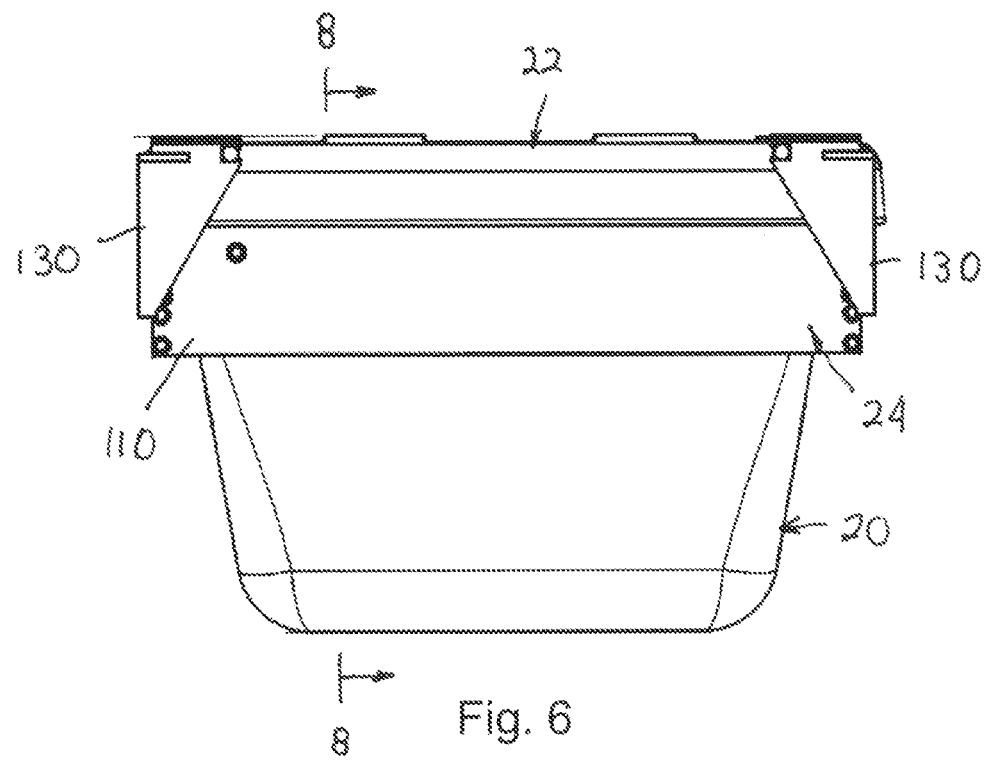
FIG. 6 is an end view of the adjustable toolbox.

An embodiment of the invention is directed to an adjustable toolbox, as illustrated at 10 in the Figures. The adjustable toolbox 10 may generally include a base portion 20, a lid portion 22 and a mounting portion 24, as illustrated in FIGS. 1-2.

The adjustable toolbox 10 may be readily adapted for pickup beds having a variety of widths. The adjustable toolbox 10 may be used with pickup beds that are open as well as pickup beds that have hard or soft tonneau covers. The components of the adjustable toolbox 10 provide the adjustable toolbox with a high strength and may be manufactured at a relatively low cost compared with prior art toolboxes that are designed for use in conjunction with pickup beds.

Figure 8:
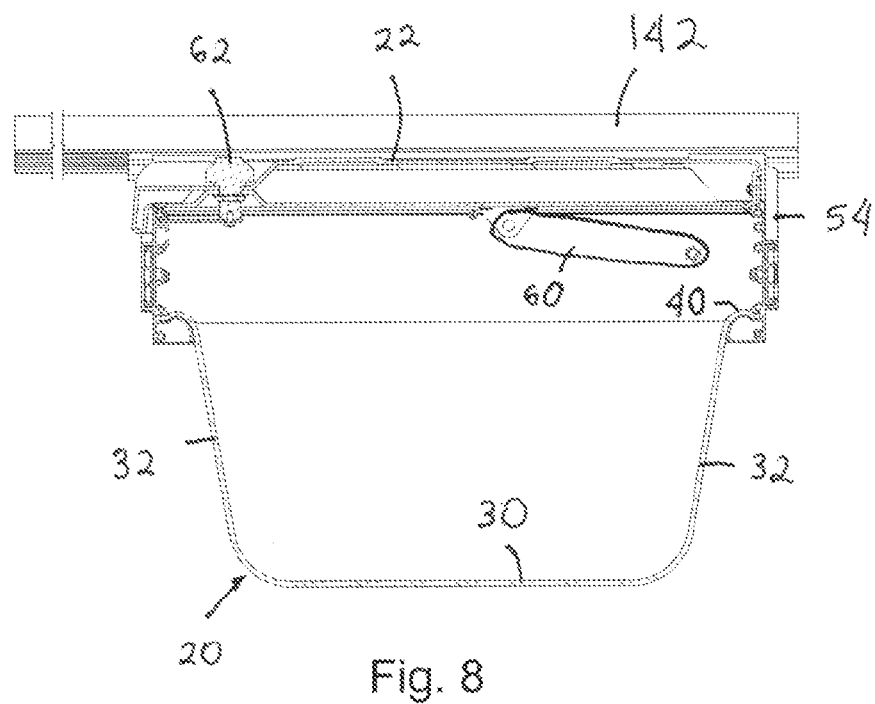
FIG. 8 is a sectional view of the adjustable toolbox taken along a line 8-8 in FIG. 6.
Figure 7:
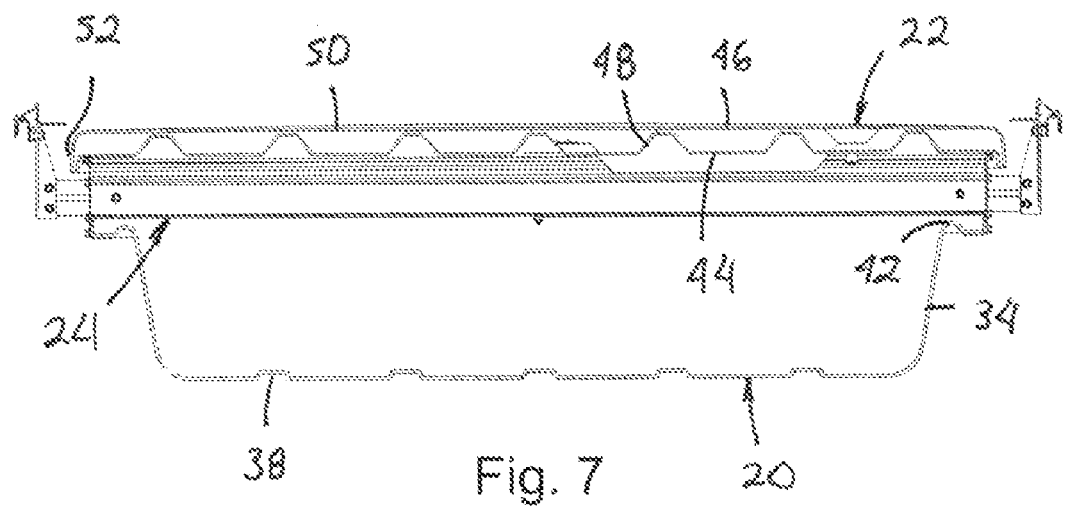
FIG. 7 is a sectional view of the adjustable toolbox taken along a line 7-7 in FIG. 4.

The base portion 20 is defined by a bottom wall 30, a pair of side walls 32 and a pair of end walls 34 that together define an enclosed region with an upwardly directed opening, as illustrated in FIGS. 7 and 8. In one configuration, the bottom wall 30, the pair of side walls 32 and the pair of end walls 34 are integrally fabricated.

The side walls 32 and the end walls 34 may be generally vertically oriented. In certain embodiments, the side walls 32 and the end walls 34 may be oriented at an angle with respect to the bottom wall 30 of between about 90 and 120 degrees.

To enhance the strength of the side walls 32 and the end walls 34, as least one rib may be provided in at least one of the side walls 32 and the end walls 34. At least one rib 38 may also be formed in the bottom wall 30.

Another benefit of placing the at least one rib 38 in the bottom wall 30 is that the at least one rib 38 may facilitate maintaining objects at desired locations within the adjustable toolbox 10. In this regard, the at least one rib 38 formed in the bottom wall 30 may have a greater height than the at least one rib 36 formed in the side walls 32 and the end walls 34.

To facilitate attachment of the base portion 20 to the mounting portion 24, an outwardly extending lip 40 may be provided along an upper edge 26 of at least one of the side walls 32. An outwardly extending lip 42 may also be provided on at least one of the end walls 34. As illustrated in the figures, the lip 40 and the lip 42 may be curved.

The base portion 20 may be fabricated from a variety of materials and techniques utilizing the concepts of the invention. One suitable material for fabricating the base portion 20 is a thermoplastic olefin. Examples of techniques that may be used to fabricate the base portion 20 are vacuum forming, injection molding and rotational molding.

The base portion 20 may be formed with a length, width and depth based upon the vehicle in which the adjustable toolbox 10 is intended to be used. To maximize the storage capacity of the adjustable toolbox 10, the length of the adjustable toolbox 10 may be selected to be approximately the same as a width of the pickup bed in which the adjustable toolbox 10 is intended to be used.

In one configuration, the base portion 20 has a length of up to about 72 inches and preferably between about 40 and 60 inches, a width of up to about 36 inches and preferably between about 12 and 24 inches, and a height of up to about 24 inches and preferably between about 6 and 18 inches.

A thickness of the bottom wall 30, the pair of side walls 32 and the pair of end walls 34 may be selected based upon the anticipated conditions under which the adjustable toolbox 10 will be used, such as the weight of the object that will be placed in the adjustable toolbox 10.

When the base portion 20 is fabricated from molded plastic, the bottom wall 30, the side walls 32 and the end walls 34 may have a thickness of up to about ¾ of an inch and preferably about 3/16 of an inch.

While the base portion 20 is illustrated as having a single wall construction, it is possible to use other configurations in conjunction with the concepts of this invention, examples of which include multiple layer walls and corrugated walls.

To further enhance the durability of the base portion 20, a coating may be applied to the inner surface thereof. An example of one such coating is a transparent acrylic film, such as is available under the designation KORAD from Spartech PEP.

As an alternative to using a single base portion 20, it is possible to form the base portion 20 in at least two sections. These sections may have different dimensions such as a different depth or that have different features to facilitate organizing particular types of objects.

In certain embodiments, the adjustable toolbox 10 may be formed without a lid portion 22. As is discussed in more details herein, the adjustable toolbox 10 may be used in conjunction with a tonneau cover that extends over the adjustable toolbox 10 and thereby covers the adjustable toolbox.

The lid portion 22 may have a length and a width that generally corresponds to the length and the width of the base portion 24 such that the lid portion 22 substantially covers the base portion 20 when the lid portion is placed over the base portion 20, as illustrated in FIGS. 1, 7 and 8.

To enhance the strength of the lid portion 22, the lid portion 22 may be formed with an inner lid member 44 and an outer lid member 46 that are joined together at intermediate locations therein. Alternatively or in addition to forming the lid portion 22 with the two-part configuration, it is possible to form the lid portion 22 with at least one rib 48. The at least one rib 48 may be oriented in a variety of directions.

The lid portion 22 may be fabricated from a variety of materials and techniques utilizing the concepts of the invention. One suitable material for fabricating the lid portion 22 is a thermoplastic olefin. It is also possible to fabricate the lid from a metallic material such as aluminum. Examples of techniques that may be utilized to fabricate the lid portion 22 are vacuum forming, injection molding and rotational molding.

The lid portion 22 may be formed with a central region 50 and a side region 52. The side region 52 extends from the central region 50 along at least one side thereof. In addition to increasing the strength of the lid portion 22, the side region 52 may also help to seal the adjustable toolbox 10 to reduce the potential of water such as rain from entering the adjustable toolbox 10.

While the lid portion 22 is illustrated as being a single piece, the lid portion 22 may take alternative configurations such as having two or more sections. Using these alternative configurations permits the lid portion 22 covering one of the sides of the adjustable toolbox 10 to be opened without opening the entire lid portion 22.

The lid portion 22 may be mounted using a variety of techniques. One such suitable technique is pivotally mounting in which the lid portion 22 is generally horizontally oriented when in an open configuration and generally vertically oriented when in a closed configuration. While not illustrated, it is possible to use other techniques for mounting the lid portion 22, an example of one such technique is sliding.

Figure 9:
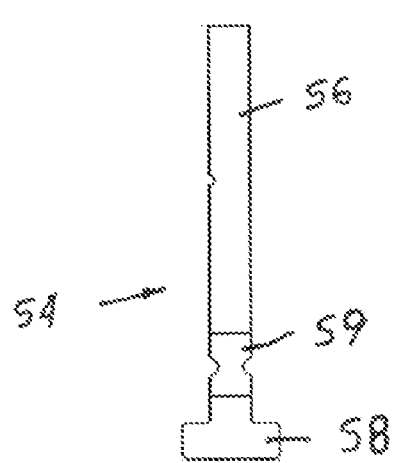
FIG. 9 is a hinge mechanism for operably attaching a lid portion of the adjustable toolbox.

A variety of techniques may be used to pivotally mount the lid portion 22. One such technique is a living hinge 54 that includes an upper hinge section 56, a lower hinge section 58 that are operably connected with a flexible central section 59, as illustrated in FIG. 9. The living hinge 50 may extend substantially along the length of the adjustable toolbox 10. In addition to pivotally mounting the lid portion 22, the living hinge 50 restricts the entry of water into the adjustable toolbox 10. It is also possible to attach the lid portion 22 using a conventional hinge (not shown) having a pair of hinge leaves that are pivotally attached with a hinge pin.

To reduce the potential of water entering the sides and the front of the adjustable toolbox 10, a weather-strip 76 may be provided along the sides and the front of the adjustable toolbox 10. The weather-strip 76 may seat in the channel 82 at the upper end of the mounting rail 70 and the channel 118 at the upper end of the end frame 110.

Figure 10:
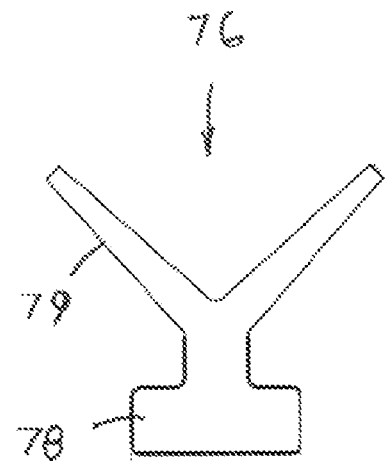
FIG. 10 is a sealing mechanism for use in the adjustable toolbox.

In one configuration, the weather-strip 76 may include a lower section 78 and an upper section 79, as illustrated in FIG. 10. The lower section 78 may include a shape that substantially conforms to the shape of the channel 82 or the channel 118. In one configuration, the upper section 79 includes two extensions that are oriented at an angle with respect to each other. The weather-strip 76 may be fabricated from a resilient material so that the weather-strip 76 deforms as the lid portion 22 is closed to form a substantially waterproof seal.

To maintain the lid portion 22 in an open configuration, a gas spring 60 may be attached to the lid portion 22 and the frame portion 24, as illustrated in FIG. 8. The gas spring 60 may be selected with a strength depending on the weight of the lid portion 22 such that the gas spring 60 resists inadvertent closing of the lid portion 22.

The adjustable toolbox 10 may also include a lock mechanism 62 to restrict access to objects stored in the adjustable toolbox 10. The lock mechanism 62 may include a striker that is mounted to the box portion 20.

The lock mechanism 62 may include a latch assembly that is attached to the lid portion 22. The latch assembly may include a striker pin that is pivotally mounted therein. The striker pin is adapted to engage the striker to retain the lid portion 22 in the closed position.

Figure 11:
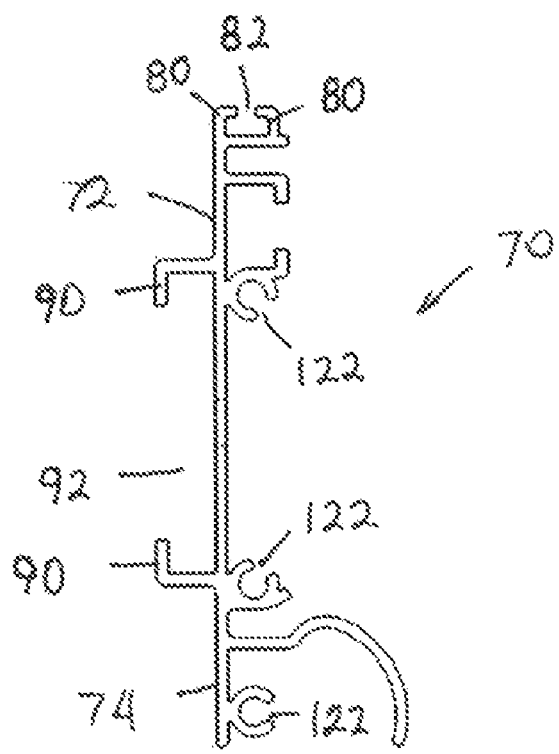
FIG. 11 is an end view of an end panel of the adjustable toolbox.
Figure 12:
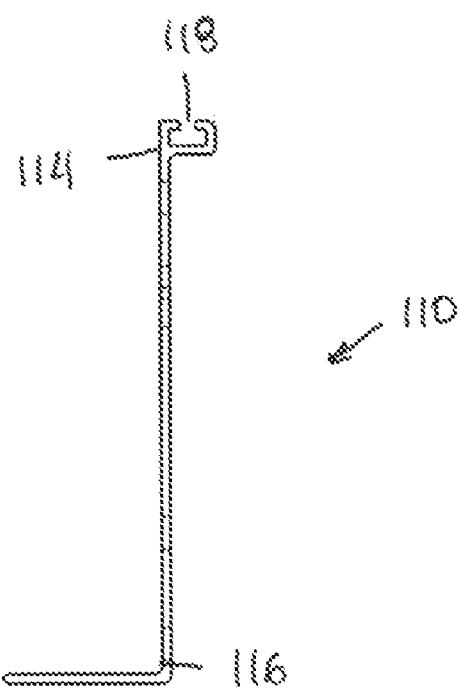
FIG. 12 is an end view of a side panel.

The mounting portion 24 not only facilitates attachment of the lid portion 22 to the base portion 20 but also facilitates attachment of the adjustable toolbox 10 to the pickup bed and support the adjustable toolbox 10 in the pickup bed. The mounting portion 24 may include a pair of mounting rails 70 that each include an upper attachment region 72 and a base attachment region 74, as illustrated in FIG. 11.

The upper attachment region 72 may be used to facilitate attachment of the living hinge 50 and the seal 58 to the mounting rail 70. In one configuration, the upper attachment region 72 includes two legs 80. At least one of the legs 80 has a portion that is directed toward the other leg 80 to define a partially enclosed channel 82. The channel 82 may have a height and a width that are approximately the same of the lower hinge section 54 such that the lower hinge section 54 is retained in the channel 82.

The base attachment region 74 may be curved to generally conform to the shape of the lip 40. The base attachment region 74 thereby supports the lip 40 and retains the base portion 20 in a stationary position with respect to the mounting rail 70. The lip 40 may be attached to the base attachment region 74 using a variety of mechanism such as an adhesive or a mechanical fastener such as screws or rivets (not shown).

Intermediate the upper attachment region 72 and the base attachment region 74, the mounting rail 70 may also include two arms 90 extending therefrom. At least one of the arms 90 has a portion that is directed toward the other arm 90 to define a partially enclosed channel 92.

The channel 92 may have a height and a width that are approximately the same as a length and a width of a support arm 100, which is described in more detail below. This configuration thereby enables the support arm 100 to be slidably mounted in the channel 92.

To further strengthen the adjustable toolbox 10, an end frame 110 may extend between the mounting rails 70 on opposite sides of the base portion 20. The end frames 110 may be attached to the mounting rails 70 using a variety of techniques.

Similar to the mounting rail 70, the end frame may include an upper attachment region 114 proximate an upper end thereof and a base attachment region 116 proximate a lower end thereof. The upper attachment region 114 may have a channel 118 that is adapted to receive a weather-strip 76 that prevents water from entering the adjustable toolbox 10.

In one configuration, the base attachment region 116 is substantially flat and extends generally transverse to the end frame 110. In other configurations, the base attachment region 116 may be curved similar to the base attachment region on the mounting rails 70.

Figure 13:
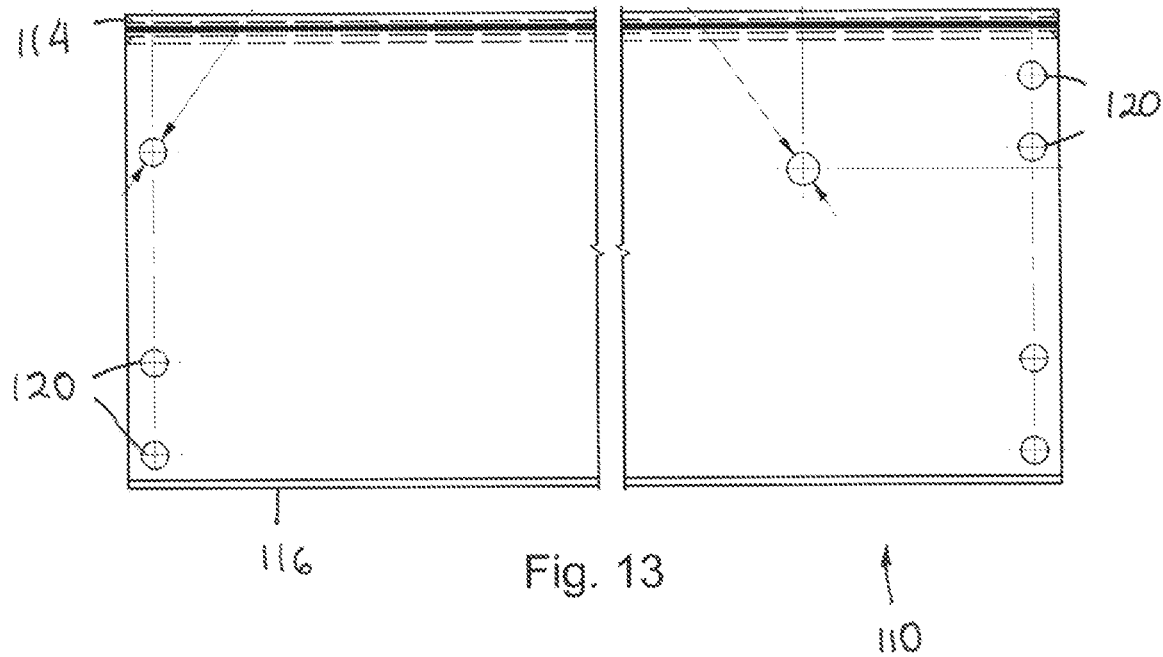
FIG. 13 is a side view of the side panel of the adjustable toolbox.

Proximate opposite ends thereof, the end fame 110 may include a plurality of apertures 120 formed therein, as illustrated in FIG. 13. The apertures 120 may be adapted to receive screws (not shown) that engage the mounting rails 70 through semi-circular recesses 122 that are mounted to the surface thereof. In addition to facilitating the attachment of the end frame 110 to the mounting rails 70, the semi-circular recesses 122 can also increase the strength of the mounting rails 70.

Figure 14:
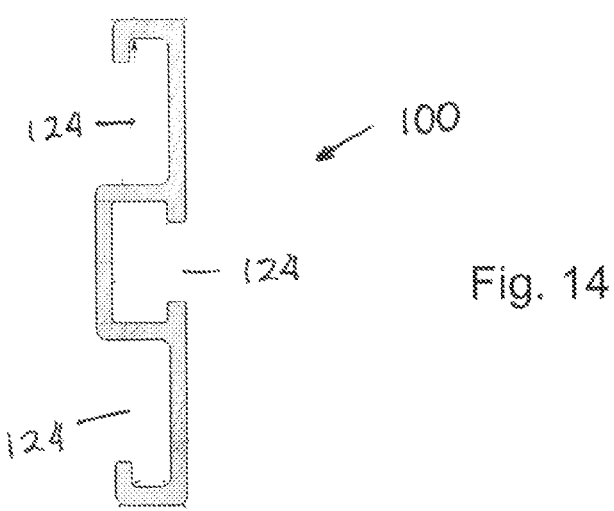
FIG. 14 is an end view of a support arm of the adjustable toolbox.

The support arm 100 may have a generally rectangular configuration, as illustrated in FIG. 14. While it is possible for the support arm 100 to be substantially solid, the support arm 100 may be formed with at least one recess 124. The at least one recess reduces the weight of the support arm 100 and reduces the manufacturing costs as compared to using a solid configuration.

A mounting bracket 130 is attached to an end of the support arm that is opposite the mounting rail 70. The mounting bracket 130 facilitates attachment of the adjustable toolbox 10 to the pickup bed. While it is possible to attach the mounting bracket 130 to the pickup bed using a fastener such as a bolt or screw, it is generally not desired to use such a mechanism for attaching the mounting bracket 130 to the pickup bed because forming holes in the pickup bed could degrade the strength of the pickup bed and could provide locations in which rust initiates.

In certain embodiments, the mounting bracket 130 is formed with a length that causes at least a portion of the base portion 20, the lid portion 22 and the mounting portion 24 are above an upper surface of the pickup bed to which the adjustable toolbox 10 is mounted. In such a configuration, the lid portion 22 may not only extend over the base portion 20 but also part of the pickup bed. For example, the lid portion 22 may extend over a front portion of the pickup bed.

In certain embodiments, the mounting bracket 130 includes an upper bracket portion 132 and a lower bracket portion 134. The lower bracket portion 134 may be attached to the support arm 100 using a fastening mechanism 136. The upper bracket portion 132 may have a mounting arm 138 extending therefrom.

A tonneau cover adapter bracket 140 may be used for attachment of the mounting bracket 130 to the pickup bed especially when a mounting track 142 is attached to the pickup bed. The mounting track 142 may be used for a variety of purposes such as attaching a soft tonneau cover to the pickup bed.

The mounting track 142 may include three primary sections, an attachment region 144, a fastener region 146 and a support region 148. The mounting track 142 is attached to the pickup bed using a clamp (not shown) that engages the attachment region 144 and the pickup bed. To enhance the frictional engagement of the components, the surface of the attachment region 144 may be textured such as including at least one groove in the surface thereof.

Figure 15:
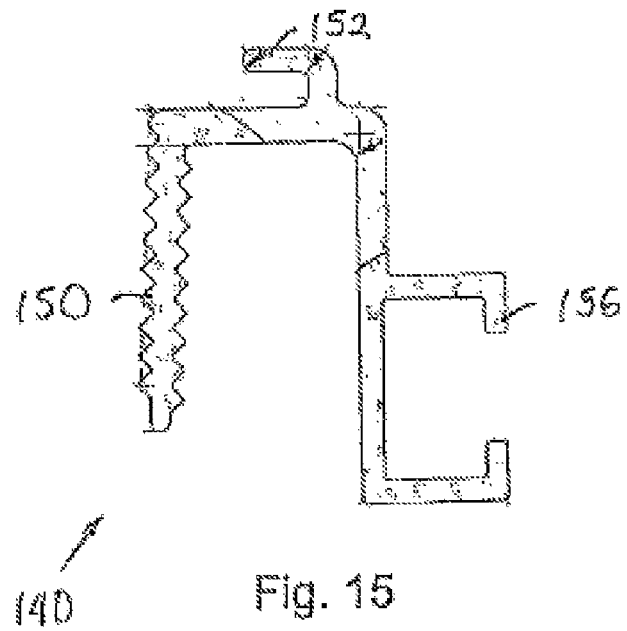
FIG. 15 is an end view of a mounting rail of the adjustable toolbox.
Figure 17:
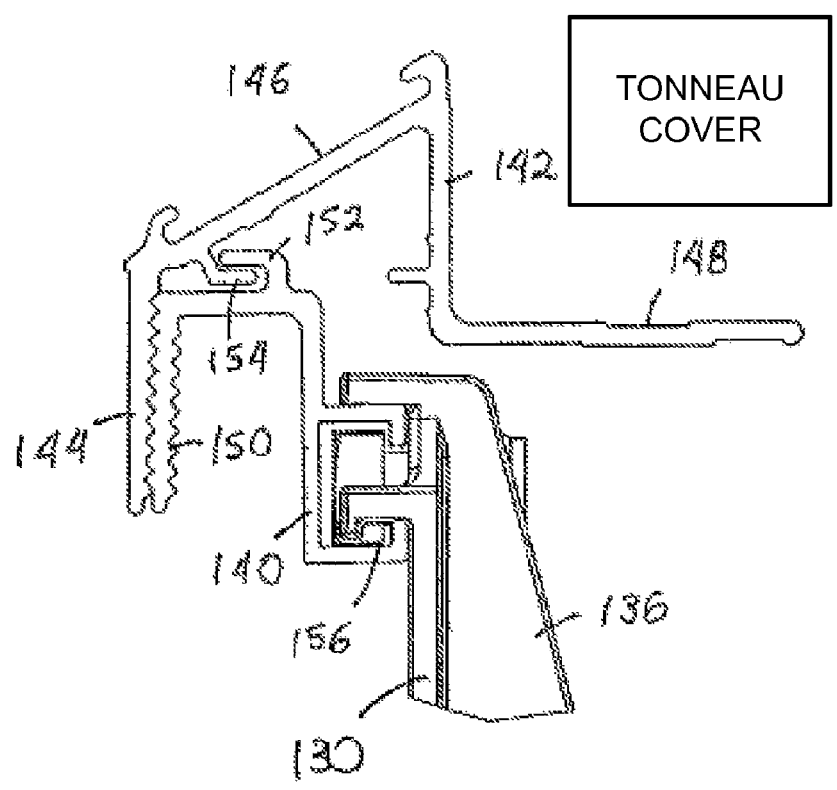
FIG. 17 is an enlarged side view of attachment of the adjustable toolbox to the tonneau cover mounting rail.
Figure 16:
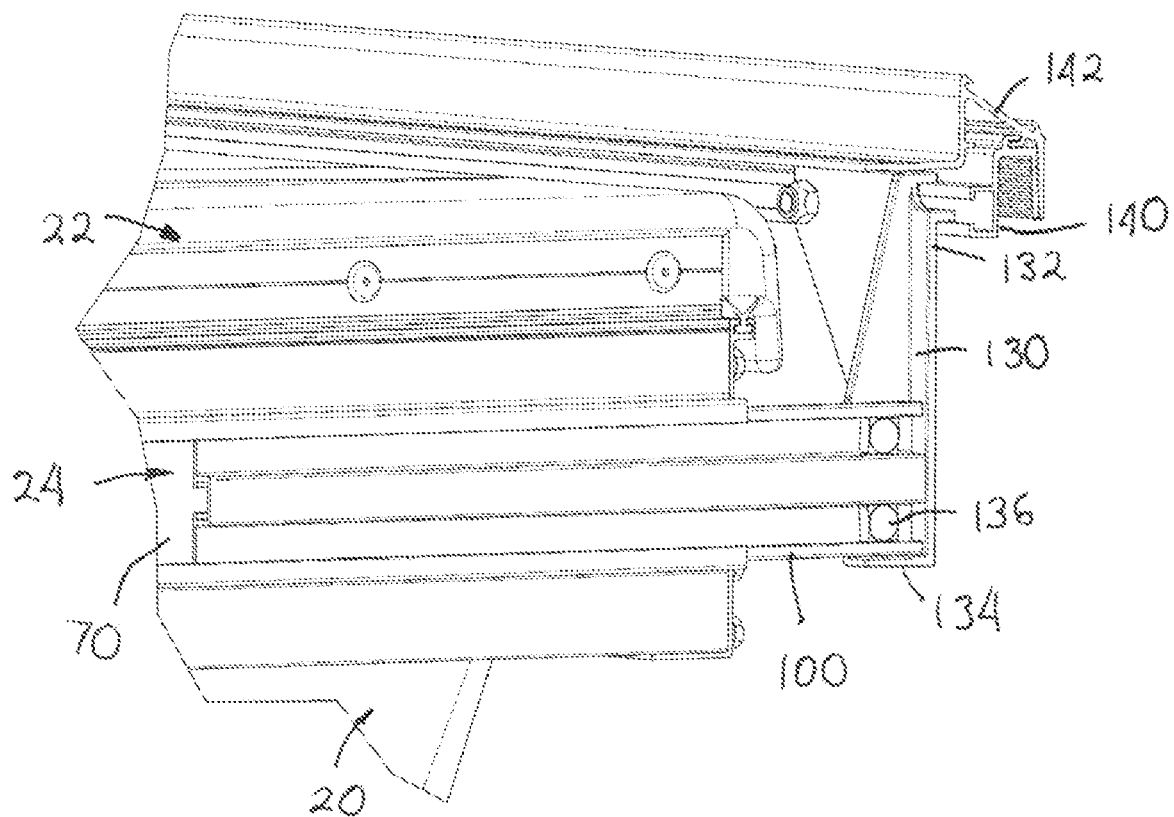
FIG. 16 is a perspective view showing attachment of the adjustable toolbox to a tonneau cover mounting rail.

The adapter bracket 140 includes an attachment region 150 that may be placed adjacent the attachment region 144 prior to clamping, as illustrated in FIGS. 15-17. To minimize the potential of the attachment region 144 moving with respect to the attachment region 150, a surface of the attachment region 150 may include at least one groove in the surface thereof.

The adapter bracket 140 may also include an arm 152 extending from an upper surface thereof. The arm 152 may engage a complementarily shaped arm 154 that extends from the mounting track 144 to further reduce the potential of the adapted bracket 140 moving with respect to the mounting track 142.

A lower end of the adapter bracket 140 may include a channel 156 formed therein. The channel 156 may receive the mounting arm 136 for attaching the adjustable toolbox 10 to the pickup bed, as illustrated in FIG. 17.

Because the adjustable toolbox 10 is recessed below an upper surface of the pickup bed, the adjustable toolbox 10 may be used in conjunction with a tonneau cover that is attached to the surface of the pickup bed. When the tonneau cover is in the closed configuration, the tonneau cover extends over the adjustable toolbox 10 as well as the rest of the pickup bed.

In certain embodiments, the mounting rails 70, the end frames 110 and the support arms 100 are formed from a lightweight but strong material. One such suitable material is aluminum, which may be formed by extrusion.

In certain embodiments, the adjustable toolbox 10 may be movably mounted in the pickup bed. For example, the adjustable toolbox 10 may be slidable from a front of the pickup bed to an intermediate area or back of the pickup bed. Slidable mounting may be done using a variety of techniques such as sliding a surface with respect to another surface. It is also possible to use rollers to facilitate moving the adjustable toolbox 10 with respect to the pickup bed.

While the side walls in certain pickup beds are substantially parallel to each other, the side walls in certain pickup are not oriented in a substantially parallel relationship to each other. The mounting bracket or other portions of the adjustable toolbox 10 may be flexible or otherwise adjustable to facilitate adjusting a width of the adjustable toolbox 10 so that the adjustable toolbox 10 does not come off of the track or rail to which it is mounted.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An adjustable toolbox for use in conjunction with a bed on a pickup, wherein the pickup bed has a lower surface and a pair of side walls extending therefrom, wherein the adjustable toolbox comprises:
   a base portion having a recess formed therein that is adapted to receive at least one object;
   a mounting portion operably attached to the base portion so that at least part of the mounting portion is slidable with respect to the base portion to adjust a width of the adjustable toolbox, the mounting portion having a pair of mounting rails that each includes an upper attachment region and a base attachment region, each of the pair of mounting rails includes an intermediate channel formed therein, wherein the intermediate channel is adapted to receive a mounting assembly, the mounting assembly having a support arm that is slidably mounted with respect to the intermediate channel and a mounting bracket attached to the support arm opposite the mounting rail to which the support arm is slidably mounted;
   a mounting track attached to each of the side walls, wherein the mounting portion slidably engages the mounting track to attach the adjustable toolbox to the pickup bed and support the adjustable toolbox in the pickup bed; and
   a tonneau cover adapter bracket, wherein the tonneau cover adapter bracket is attached to a tonneau cover mounting track that secures the tonneau cover to the pickup bed and wherein the mounting bracket attaches to the tonneau cover adapter bracket.

2. The adjustable toolbox of claim 1, wherein the tonneau cover adapter bracket comprises an attachment region and a channel, wherein the tonneau cover mounting track engages the attachment region and wherein the attachment region is adapted to receive a portion of the mounting bracket.

3. A system for storing objects in a bed on a pickup, the system comprising:
   a base portion having a recess formed therein that is adapted to receive at least one object;
   a mounting portion operably attached to the base portion so that at least part of the mounting portion is slidable with respect to the base portion to adjust a width of the system, the mounting portion comprises a pair of mounting rails that each include an upper attachment region and a base attachment region, the pair of mounting rails comprises an intermediate channel formed therein, wherein the intermediate channel is adapted to receive a mounting assembly and wherein the mounting assembly comprises a support arm that is slidably mounted with respect to the intermediate channel and a mounting bracket attached to the support arm opposite the mounting rail to which the support arm is slidably mounted;
   a mounting track attached to the pickup bed, wherein the mounting portion is slidably attached to the mounting track so that the base portion is supported in the pickup bed and wherein the upper surface of the base portion is below an upper surface of the pickup bed; and
   a tonneau cover adapter bracket, wherein the tonneau cover adapter bracket is attached to a mounting track that secures the tonneau cover to the pickup bed and wherein the mounting bracket attaches to the tonneau cover adapter bracket.

4. The system of claim 3, wherein the tonneau cover adapter bracket comprises an attachment region and a channel, wherein the tonneau cover mounting track engages the attachment region and wherein the attachment region is adapted to receive a portion of the mounting bracket.

5. A system for storing objects in a bed on a pickup, the system comprising:
   a mounting track operably attached to the pickup bed;
   an adjustable toolbox comprising:
      a base portion having a recess formed therein that is adapted to receive at least one object;
      a mounting portion operably attached to the base portion so that at least part of the mounting portion is slidably with respect to the base portion to adjust a width of the adjustable toolbox, wherein the mounting portion is slidably attached to the mounting track to support the adjustable toolbox in the pickup bed, the mounting portion comprises a pair of mounting rails that each include an upper attachment region and a base attachment region, wherein the pair of mounting rails further comprises an intermediate channel formed therein, wherein the intermediate channel is adapted to receive a mounting assembly and wherein the mounting assembly comprises a support arm that is slidably mounted with respect to the intermediate channel and a mounting bracket attached to the support arm opposite the mounting rail to which the support arm is slidably mounted;

a tonneau cover operably attached to the mounting track, wherein the tonneau cover is movable between an open configuration and a closed configuration, wherein the tonneau cover substantially covers the adjustable toolbox when the tonneau cover is in the closed configuration; and a tonneau cover adapter bracket, wherein the tonneau cover adapter bracket is attached to a mounting track that secures the tonneau cover to the pickup bed and wherein the mounting bracket attaches to the tonneau cover adapter bracket.

6. The system of claim 5, wherein the tonneau cover adapter bracket comprises an attachment region and a channel, wherein the tonneau cover mounting track engages the attachment region and wherein the attachment region is adapted to receive a portion of the mounting bracket.

* * * * *

UNITED STATES PATENT AND TRADEMARK OFFICE
CERTIFICATE OF CORRECTION

| | | |
|---|---|---|
| PATENT NO. | : 7,887,114 B2 | Page 1 of 1 |
| APPLICATION NO. | : 12/275910 | |
| DATED | : February 15, 2011 | |
| INVENTOR(S) | : Michael Spencer | |

It is certified that error appears in the above-identified patent and that said Letters Patent is hereby corrected as shown below:

Column 3, line 6, "as least" should be --at least--.

Column 3, line 17, after "edge", delete "26".

Column 3, line 65, "details" should be --detail--.

Column 5, line 20, "support" should be --supports--.

Column 5, line 31, "of" should be --as--.

Column 5, line 40, "mechanism" should be --mechanisms--.

Column 7, line 34, after "pickup", insert --beds--.

Column 8, line 55, Claim 5, "slidably" should be --slidable--.

Signed and Sealed this
Third Day of May, 2011

David J. Kappos
*Director of the United States Patent and Trademark Office*